Figure 1:
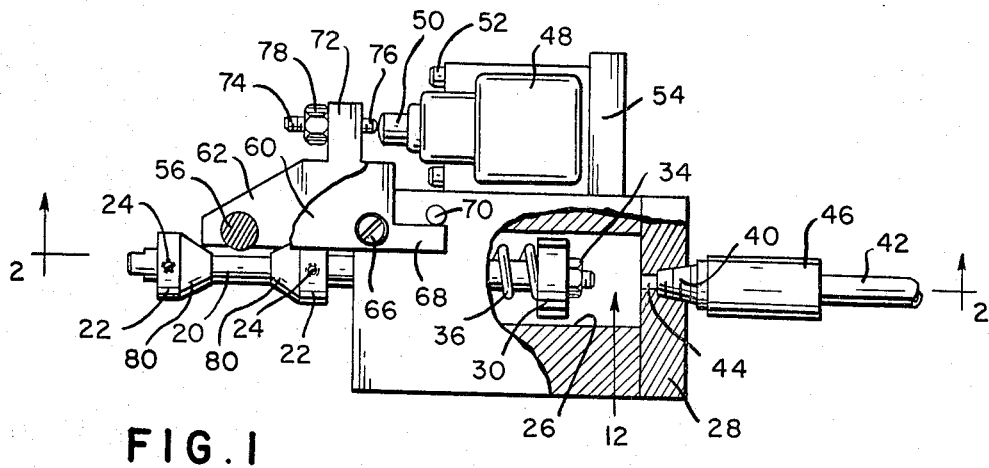

INVENTOR.
EDWARD P. BULLARD III
BY
John H. Midney
ATTORNEY

United States Patent Office 3,372,622
Patented Mar. 12, 1968

3,372,622
MULTIPLE PRESSURE RESPONSIVE
CONTROL APPARATUS
Edward P. Bullard III, Fairfield, Conn., assignor to The Bullard Company, Bridgeport, Conn., a corporation of Connecticut
Filed May 18, 1966, Ser. No. 551,026
10 Claims. (Cl. 92—5)

The present invention relates to the sensing of predetermined abnormal pressure conditions in pressurized fluid systems, and has particular reference to a simplified, compact apparatus having a single control element operatively connected to a number of pressure-responsive devices to be actuated thereby when the pressure condition in any one of the pressurized fluid systems associated therewith deviates from predetermined conditions.

In machinery having hydraulic actuators for producing movements of various of the machine members, and lubrication systems in which lubricant is pressure fed to various points, it is generally essential to the proper operation of the machine to insure that the pressure of the hydraulic fluid in the various operating systems and of the lubricant in the lubrication system be maintained within specific ranges at all times while the machine is in operation. In the event that the lubricant pressure is insufficient, for example, lubricant flow to certain parts of the machine may be inadequate or interrupted, and continued operation of the machine in such a circumstance may result in severe and costly damage to the machine parts. Similarly, a pressure of the hydraulic fluid in any of the operating systems which is greater or less than the designed ranges of pressure may result in improper operation of, or even damage to, the machine.

In operating machine members by pressurized hydraulic fluid, it is generally desirable to employ a specific range of operating pressures which is no less than and only moderately higher than the pressure necessary to do the required work. A pressure lower than the designed range of pressures may affect the rate and amount of movement of the machine member or a control component, creating conditions in which a machine member may fail to be moved sufficiently or rapidly enough to clear a workpiece during subsequent machine operation. As a result, the machine may be damaged unless its operation is immediately stopped. An abnormally high pressure in a hydraulic operating system may be indicative of a jammed machine part. The excessive forces which may result from the abnormally high pressure may cause damage or breakage of a machine component unless the machine is stopped and the condition corrected.

To protect against abnormal pressure conditions as well as to insure proper lubrication, hydraulically actuated machinery may be provided with a multiplicity of separate pressure-sensing devices and associated control elements, such as switches, for monitoring the various hydraulic and lubricating systems. The switches are generally connected in series with the prime mover so as to cut off the power thereto when an abnormally high or low variation occurs in any one of the systems. While reliable monitoring of the various fluid systems can thus be achieved, the multiplicity of components and the relative complexity of incorporating them into the machine add substantially to the overall cost.

Accordingly, an object of the present invention is to provide an improved control apparatus responsive to a multiplicity of predetermined abnormal pressure conditions in a number of fluid systems which is compact and relatively simple in construction, reliable in operation, and inexpensive to manufacture.

Another object is to provide such an apparatus which is responsive to abnormally high pressure conditions as well as to abnormally low pressure conditions in one or more of the fluid systems.

Another object is to provide such an apparatus wherein a single control element may be simultaneously actuatable by any abnormally high or low pressure condition in any one of a number of pressurized fluid systems.

Yet a further object is to provide such an apparatus in which the high or low pressure conditions to which the control element is responsive can be variably adjusted.

Still a further object is to provide such an apparatus for stopping the operation of a machine by actuating a single switch when the pressure in any one hydraulic or lubricating system thereof is not within predetermined ranges.

The above and other objects may be accomplished by providing in accordance with the present invention a single control element, such as a normally closed electrical switch, in series with the prime mover of a machine having a plurality of pressurized fluid systems, which may include one or more hydraulic systems for operatively moving machine members and a pressurized lubricating system. An actuator rod is pivotally mounted relative to the switch for limited movement between positions in which a lever attached thereto engages the switch to open the same and disengages the switch an amount sufficient to permit it to be moved to its normally closed position. Pressure-sensing devices connected to each of the pressurized fluid systems may be provided with reciprocable shafts with actuating members thereon. Each shaft is movable by its sensing device to predetermined positions depending on the pressure of its associated fluid system. Also, the shafts and actuating members are positioned relative to the actuator rod such that they are out of engagement therewith when the pressures in their respective fluid systems are within preset limits. However, when the pressure in any one of the fluid systems deviates from the preset limits, the sensing device associated therewith moves its respective shaft to a position whereby an actuating member mounted thereon contacts the actuator rod and moves the rod to a position wherein the lever connected thereto engages and opens the switch to stop the machine. The actuating members may be adjustably positioned on the shafts to permit precise adjustment and variation of the pressures at which they will contact and move the actuator rod.

Numerous other objects and advantages of the invention will be apparent as it is better understood from the following description which, taken in connection with the accompanying drawing, discloses a preferred embodiment thereof.

Figure 2:
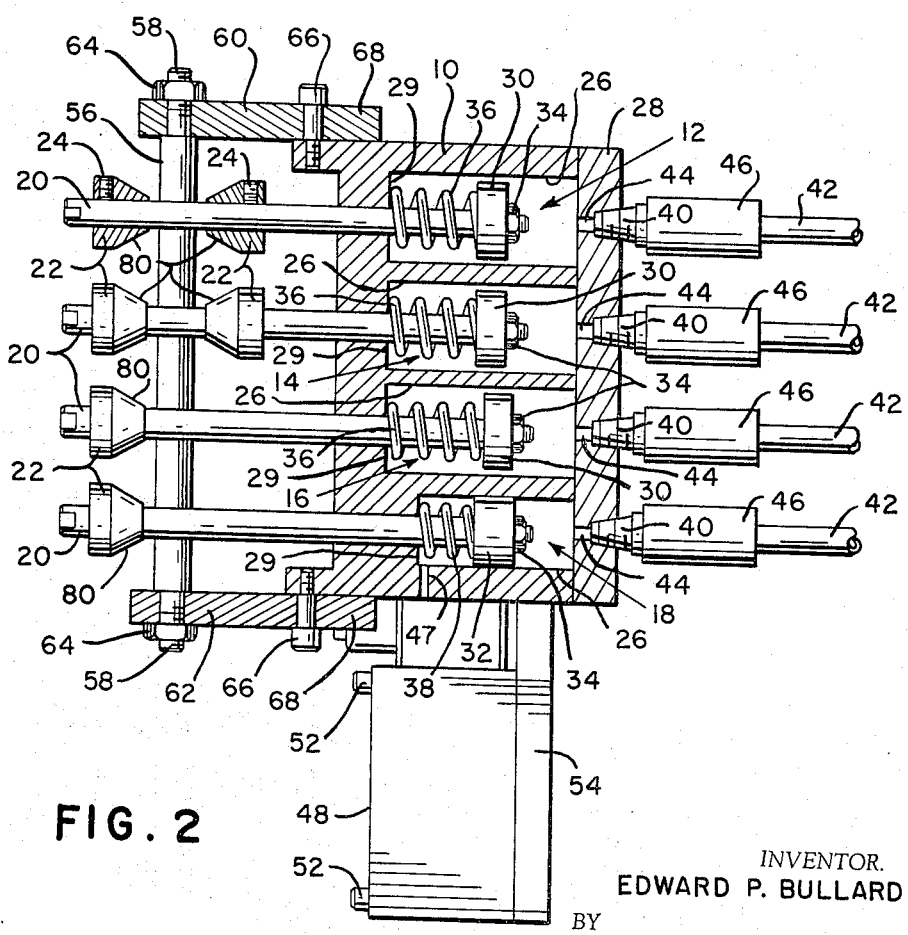

Referring to the drawing:

FIG. 1 is a plan view, partially in section, of a control apparatus embodying features of the present invention; and FIG. 2 is a sectional view taken substantially along the line 2—2 of FIG. 1.

As a preferred or exemplary embodiment of the invention, FIGS. 1 and 2 show a control apparatus having a housing 10 enclosing four pressure-sensing devices 12, 14, 16 and 18. Each sensing device 12, 14, 16 and 18 has a shaft 20, preferably all of the same diameter, reciprocably mounted in and extending from the housing 10 in parallel relation, the axes of reciprocation of the shafts being located in the same plane. Actuating members 22 positioned on the outwardly extending ends of the shaft 20 are adjustably connected thereto by set screws 24. Each shaft 20 and its associated actuating members 22 are adapted to be moved relative to the housing 10 by the respective pressure-sensing devices 12, 14, 16 and 18 as will be hereinafter described.

The pressure-sensing devices 14, 16, 18 and 20 include cylindrical bores 26 formed in the housing 10, with the outer ends thereof sealed by an end plate 28. Each cylindrical bore 26 is axially aligned with a shaft 20, with the shafts extending into the bores through the inner ends 29 thereof. Pistons 30 and 32, fastened to threaded ends of the shafts 20 by nuts 34, are urged toward the end plate 28 (rightwardly as shown in FIG. 2) by springs 36 and 38, respectively, disposed between the inner ends 29 of the cylindrical bores 26 and the pistons. It is to be understood that sealing elements such as O ring seals are used in appropriate locations to prevent leakage, e.g., between the shafts 20 and housing 10. Since the provision of such elements is well known in the art, they have been omitted from the description herein.

Adjacent each of the cylindrical bores 26, the end plate 28 threadably engages end fittings 40 of hydraulic lines 42. Each of the lines 42 communicates with a source of pressurized fluid, the pressure of which is to be sensed by the respective sensing devices. Openings 44 extending through the end plate 28 connect each line 42 to the interior of one of the cylindrical bores 26. Preferably, a pulsation dampener 46 is provided in each line 42 to minimize the effects of pulsations in the fluid pressure of the respective sources attributable to pump operating characteristics, etc.

The area upon which the pressurized fluid is effective on the pistons 30 and 32 and the deflection characteristics of the springs 36 and 38 can be readily selected to achieve a predetermined positioning of the shaft 20 and its associated actuator members 22 relative to the housing 10 in accordance with the fluid pressure to which the pressure-sensing devices 12, 14, 16 and 18 are connected. In the exemplary embodiment of the invention, the sensing devices 12, 14 and 16 are adapted to be connected to hydraulic systems of relatively high pressure, such as are generally used for moving servo-controlled machine members. In order that the springs 36 not be required to have inordinately high force-deflection characteristics which may affect their life and reliability, the pistons 30 have a diameter which permits the fluid to simultaneously act on both sides of the pistons so that the effective areas are thus merely the cross sectional areas of the shafts 20.

The sensing device 18, on the other hand, is adapted to be connected to a fluid system of relatively low pressure, such as a lubricant system of a machine. The sensing device 18 accordingly is provided with a seal between the piston 32 and bore 26 in the well-known manner so that the pressurized fluid acts on only one side of the piston. The effective area is thus the cross sectional area of the piston 32 which, because of the relatively low pressure fluid acting thereon, still permits the spring 38 to have acceptable design characteristics. A hole 47 may be provided adjacent the inner end 29 of the cylindrical bore 26 of sensing device 18 to permit venting of the space behind the piston 32.

It will be apparent to those skilled in the art that various configurations of the pressure-sensing devices may be employed for various applications of the subject invention, it only being necessary that the characteristics of the devices be such that the shafts 20 be reciprocable in accordance with the pressures of the respective sources to predetermined positions relative to the housing 10.

A normally closed switch 48 having a plunger-type operator 50 is mounted by screws 52 to a flange 54 integrally formed with, and extending from, the housing 10. An actuator rod 56 has threaded ends 58 extending through upper and lower arms 60 and 62, respectively, and fastened thereto by nuts 64. The arms 60 and 62 are pivotally mounted to the housing 10 by studs 66 and have members 68 which abut against pins 70 extending from housing 10 to limit the pivotal movement in one direction (counterclockwise as viewed in FIG. 1) of the interconnected arms and actuator rod 56. In this limiting position, i.e., with the members 68 abutting against the pins 70, the actuator rod 56 is positioned adjacent to, but spaced from, the shafts 20 of the sensing devices 12, 14, 16 and 18.

The lower arm 62 has a lever 72 threadably mounting an adjusting screw 74. The screw 74 has an end 76 which abuts against the plunger 50 of switch 48. A spring (not shown) internally positioned in the switch 48 biases the plunger 50 outwardly against the end 76 of the screw 74, thereby biasing the arms 60 and 62 and the actuator rod 56 toward the counterclockwise limiting position (as viewed in FIG. 1). The position of the screw 74 in the lever 72 is adjusted so that with the actuator rod 56 in the counterclockwise limiting position, the end 76 of the screw just abuts the plunger 50 with the switch 48 being in its normal closed position. A lock nut 78 secures the adjusting screw in this preset position. As so adjusted, movement of the actuator rod 56 in the clockwise direction (as viewed in FIG. 1) causes the screw 74 to depress the plunger 50 and open the switch 48.

Preferably, the actuator rod 56 is circular in cross section and the actuator members 22 are provided with conical surfaces 80, the smaller ends thereof extending toward the rod. As a shaft 20 is reciprocated to a predetermined position corresponding to a predetermined limiting pressure of a fluid system for continued operation, the surface 80 of an actuating member 22 is brought into contact with the rod 56. With a further deviation of the pressure beyond the limiting pressure, the surface 80 slides against and moves the rod 56 in the direction which causes the switch 48 to be opened. The positioning of an actuating member 22 on a shaft 20 may be adjusted by loosening set screw 24, moving the actuating member a desired amount, and retightening the set screw so that the surface 80 thereof will be accurately located to cause the switch 48 to be opened at a precise predetermined pressure.

It is to be particularly noted that with the control apparatus of the present invention, one or more of the pressure-sensing devices, for example, the sensing devices 12 and 14, may be provided with two actuating members 22 having oppositely facing conical surfaces 80. Each of these actuating members will thus move the actuating rod in the same direction to operate the single control element, that is, the switch 48, as the shaft 20 upon which they are mounted is moved to the left or to the right to positions corresponding to pressure magnitudes of their respective sources exceeding or being less than the desired operating range of pressures.

It will be apparent from the foregoing that the control apparatus of the present invention provides a compact, reliable and relatively inexpensive means for insuring that pressure conditions in a machine employing a number of fluid systems are within desired ranges whenever the machine is in operation. While the preferred embodiment of the mechanism described includes four pressure-sensing devices connected to four pressurized fluid sources, any number of sensing devices may be provided as may be necessary to monitor the pressure conditions in a larger or smaller number of fluid systems.

Moreover, the subject control apparatus permits the control element to be equally responsive to both abnormally high and abnormally low pressure conditions in any one or all of the fluid systems. It is to be understood, of course, that while the preferred embodiment described has a common housing for a plurality of pressure-sensing devices, it would be equally satisfactory to use individual sensing devices appropriately mounted to position the shafts thereof in the desired relation relative to the actuator rod.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

What is claimed is:
1. Multiple pressure responsive control apparatus comprising a plurality of fluid pressure-sensing devices, each having a reciprocably mounted shaft; means for fixedly mounting said sensing devices with the axes of reciprocation of said shafts disposed in substantially parallel relation in a single plane; an actuator rod disposed in a first position adjacent to the plane of movement of, but spaced from, said shafts; means mounting said rod for limited movement from said first position to a second position in a direction away from the plane of movement of said shafts; a control device; means connected to said rod for actuating said control device when said rod is moved in said direction from said first to said second position; means for connecting each of said sensing devices to a separate source of pressurized fluid; pressure responsive means in each sensing device for moving the shaft thereof in response to changes in, and maintaining the linear position of said shaft in accordance with the magnitude of, the fluid pressure of the source to which the sensing device is connected; and at least one actuating member mounted on each of said shafts and having a surface engageable with said rod when its respective shaft is reciprocated to a predetermined position relative to said rod, said actuating member surfaces of said sensing devices being located on their respective shafts so as to be out of contact with said rod when said shafts are reciprocated between positions corresponding to predetermined magnitudes of the fluid pressure of their respective sources, an actuating member surface of any one of said sensing devices being adapted to engage said rod independently of the positions of the shafts and actuating member surfaces of the other of said sensing devices, and to independently move the rod in said direction from said first to said second position to actuate said control device when the shaft of said one sensing device is reciprocated to a position corresponding to a fluid pressure of its respective source which deviates from a predetermined magnitude irrespective of whether any of said actuating member surfaces of said other of said sensing devices is in contact with said rod.

2. The apparatus set forth in claim 1 wherein said actuating member surfaces have portions which engage said rod along a line which is acutely angled relative to the plane of movement of said shafts and the direction of movement of said rod.

3. The apparatus set forth in claim 1 wherein said actuator rod is rounded in cross section and extends substantially at right angles to the axes of reciprocation of said shafts, and said actuating member surfaces are conically shaped with the smaller diameter thereof extending toward said rod.

4. The apparatus set forth in claim 3 having two actuating members mounted in spaced relation on the shaft of at least one of said sensing devices and disposed on opposite sides of said rod for respectively engaging and moving said rod in said direction from said first to said second position when said shaft is reciprocated to positions corresponding to fluid pressures of the source thereof which are slightly greater than and slightly less than a predetermined range of pressure.

5. The apparatus set forth in claim 4 additionally including means for adjustably positioning said actuating members on said shafts.

6. The apparatus set forth in claim 4 wherein said control device is an electrical switch.

7. The apparatus set forth in claim 6 wherein said actuator rod is a pivotally mounted, substantially straight member maintained in substantially parallel relation to the plane of movement of said shafts, and includes a lever fixedly connected thereto for actuating said switch when the rod is moved from said first to said second positions.

8. The apparatus set forth in claim 4 wherein said pressure responsive means comprises a piston disposed in a cylinder movable in one direction by the fluid pressure of the source to which the respective sensing device is connected, and spring means urging said piston in the other direction.

9. The apparatus set forth in claim 8 wherein the effective area of said piston and the deflection characteristics of said spring means have predetermined values whereby the shaft thereof is moved to predetermined positions in accordance with the magnitude of said fluid pressure.

10. The apparatus set forth in claim 9 wherein said spring means comprises a helically wound compression spring in abutting engagement with said piston.

References Cited
UNITED STATES PATENTS

| | | | |
|---|---|---|---|
| 1,557,330 | 10/1925 | Reynolds | 60—54.5 |
| 2,058,553 | 10/1936 | Beiderman | 200—82 X |
| 2,555,990 | 6/1951 | Newton | 200—81.5 X |
| 2,586,972 | 2/1952 | McKenzie | 200—81 X |
| 2,688,382 | 9/1954 | Georgeff | 184—6 |
| 3,239,807 | 3/1966 | Williams | 200—81 X |

MARTIN P. SCHWADRON, *Primary Examiner.*

I. C. COHEN, *Assistant Examiner.*